March 7, 1967 D. E. BERG 3,307,988
METHOD OF ASSEMBLING AN ARTICLE BY USING MAGNETS
Filed April 26, 1963
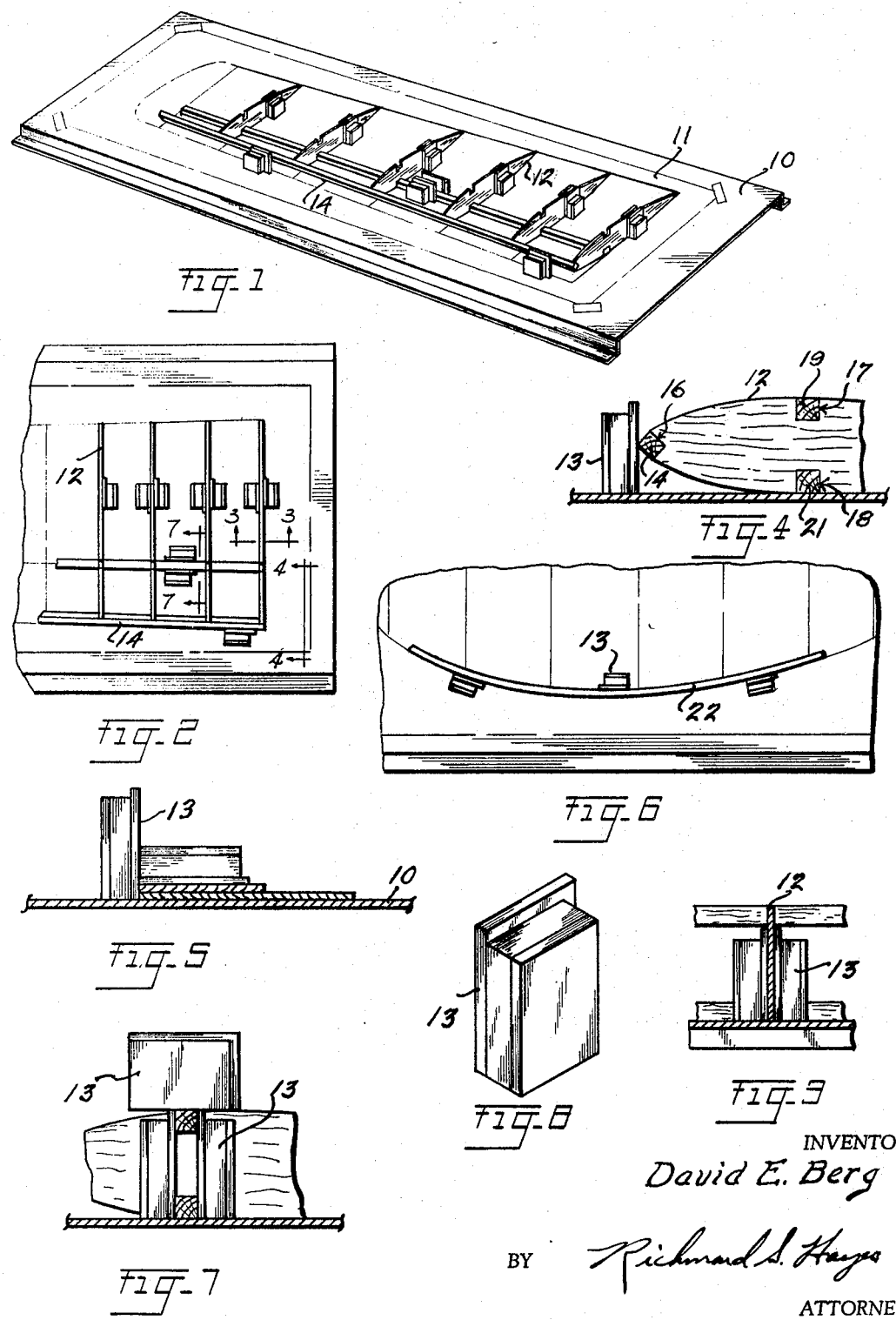
INVENTOR
David E. Berg
BY Richmond S. Hayes
ATTORNEY

United States Patent Office 3,307,988
Patented Mar. 7, 1967

3,307,988
METHOD OF ASSEMBLING AN ARTICLE
BY USING MAGNETS
David E. Berg, R.D. 3, Jamestown, N.Y. 14701
Filed Apr. 26, 1963, Ser. No. 275,957
1 Claim. (Cl. 156—60)

This invention relates to an improved method and means for assembling various parts or units through the expedient of providing a multiple piece and multi-purpose fixture or jig. More specifically, the invention provides means by which the various parts of a device may be temporarily assembled on a given layout and subsequently joined and secured to accurately produce an exact duplicate of the layout, be it the whole or unital parts of a device.

Although the invention has many applications of use, it is presently proposed to exemplify such use by one form of illustration. It will, however, be understood that the present disclosure in nowise limits use or applicability beyond that as may be determined by the following claims as they differentiate from the prior patent art.

Presently, the invention shows and describes means by which the various parts of a model airplane referred to as an article of manufacture may be arranged in their exactly required relationship and so held until a suitable bonding agent has rendered these parts non-separable and this, as it may relate to structures and devices in addition to model airplanes, constitutes an object thereof.

It is another object of the invention to provide a multiplicity of elements that may be combined in such manner as to create the equivalent of a fixture or jig required in the permanent assembly of various devices.

Another and important object of the invention lies in the provision of a plane metal surface on which a device layout may be placed and secured, together with a set of permanent magnets that are used to form a multiple element jig to exactly position the parts to be assembled in accordance with their counterpart outline on the layout.

A further and most important object of the invention is to provide permanent magnets that are so accurately formed as to assure true alignment and location of the parts held by them on the layout applied to and secured on the metal surface.

Other objects and advantages of the invention will be more fully understood from a consideration of the following specification, taken in conjunction with the accompanying drawing, and in which FIG. 1 is a top view, somewhat in perspective, and shows the invention in use in the assembly of a wing section of a model airplane;

FIG. 2 is an enlarged top view of a portion of the structure shown in FIG. 1;

FIG. 3 is a sectional view, taken substantially on the line 3—3 of FIG. 2 and shows the manner in which a pair of magnets holds one of the wing ribs in absolute alignment with the layout for a given rib;

FIG. 4 is a fragmentary end view of the inner end of the wing section shown in FIG. 2, being taken as suggested by the line 4—4 of FIG. 2;

FIG. 5 is a fragmentary sectional view showing how two or more magnets may be utilized to create a clamping action when two plane pieces are to be bonded together;

FIG. 6 suggests use of the plane surface or table in conjunction with the magnets in warping or bowing a part to a given configuration;

FIG. 7 is a sectional view, taken substantially on the line 7—7 of FIG. 2, and shows use of several of the magnets to position the upper connector with respect to the ribs; and FIG. 8 is an isometric view of one of the magnets.

Referring more particularly to the drawing, the invention, as illustrated, has to do with the arrangement of a steel plane surface or table on which to assemble various parts intended to be bonded together, in one way or another, to form a unit or an entire device. In the present illustration and for simplicity of understanding, the invention is described and displayed in connection with the assembly of one of the units of a model airplane; namely, a wing section. With this in mind, attention is directed to FIG. 1 of the drawing. Herein is shown a tray, table or other article that basically consists of a plane surface suitably rigidified to prevent twisting, bending, or warping during use. This surface, generally designated by the numeral 10, is formed from steel and, in consequence, readily attracts and holds permanent magnets thereto.

More particularly, it is proposed to utilize a rigid steel table or surface for the purpose of enabling mounting a given structural layout 11 thereon. This layout outlines the various parts intended to be permanently joined and is spread out on the surface and so secured thereto that it presents no wrinkle or other distortion. In the present disclosure, it is proposed that the surface 10 serve as a base on which to locate the various parts of the wing section that are to be joined into a fixed and permanent unit. To this end, after securing the layout 11 to the surface 10, a series of platelike ribs 12 may be placed on and exactly aligned with the correspondingly indicated parts on the layout 11. These ribs are held in place at suitable points by pairs of magnets 13 (see FIG. 3). The magnets are applied one to each opposite face of the rib and are moved into generally squeezing contact therewith. Although the magnets have strong adherence to the surface 10, they can be adjusted so that the rib will identically align with its counterpart on the layout. Now, as shown in FIG. 1, the layout represents a wing section and, of course, such a section not only includes a series of ribs 12, but also an elongated connector, such as indicated at 14. This particular connector would be considered the leading edge of the wing section and, as such, is intended to be mounted in the angular position, shown in FIG. 4, by way of engagement with suitable notches 16 at the forward ends of the ribs. As suggested, several magnets 13 are applied to the frontal edges of the connector to assure its being fully engaged with the notches 16 and in virtually permanent relationship. It will be noted, in FIG. 4, that although the leading edge connector 14 is suspended by its engagement with the rib notches, yet, due to the pressure applied against the connector edge by way of these magnets, the connector is held in proper engagement with the ribs and in exactly aligned, superposed position with respect to the layout.

As will be noted, each of the ribs 12, at approximately its widest part, is edgewise grooved, top and bottom, as at 17 and 18. These grooves are preferably rectangular and intended to locate upper and lower connectors 19 and 21, respectively. In all instances shown, the grooves 17 and 18 are of a depth such that the top and bottom surfaces of the connectors are flush with the corresponding edges of the ribs. The under connector 21 is, of course, held against the layout 11 through the use of pairs of magnets which locate each of the ribs. In other words, since pairs of magnets hold each rib in edgewise abutment with the layout, each rib in turn will exert downward pressure on the connector 21 to assure its contact and conformity with the outline therefor on the layout. The upper connector 19 may be firmly held in engagement with the various rib grooves 17 by periodic grouping of magnets, such as suggested in FIG. 7. In other words, by engaging two magnets in up-ended position with opposite sides of the connector, these magnets are of sufficient height to enable using a third magnet as a bridge therebetween and this third magnet thus applies pressure on the upper surface of this connector to assure its full engagement with the rib groove 17.

The arrangement and coupling of the magnets 13 in the various ways shown and described, of course, relates only to their use in the assembly of the wing section as outlined on the layout 11. However, when provided with an adequate supply of magnets, it will be evident that, unit by unit, or section by section, the various parts may be assembled and bonded and that many such units or sections may in turn be accurately held together by magnets on another layout provided for this purpose.

It frequently occurs, in the assembly of a structure of this nature, that certain parts must be reinforced, possibly by means of using a double thickness panel part. The two or more elements forming such a part must have accurate edgewise relationship and be so held until the applied bonding agent has set. To form such reinforcing parts, one method of using the magnets 13 is suggested in FIG. 5. Herein one magnet serves to square the ends of the two plane elements and the other magnet applies a clamping pressure as between the elements to prevent misalignment during setting of the bonding agent.

Although not shown as a part of the wing section in FIG. 1, there are many instances when elongated bars, such as suggested at 22, are required to be bowed or warped to fit certain other parts. As suggested in FIG. 6, by the placing of one or more magnets against the inner surface at the location to be bowed and forcing other magnets to bend the ends, the desired curvature may be produced to correspond to the outline of a layout and accurately held until the bonding agent has set, at which time the bar will be correctly bowed and permanently joined to its associated parts.

From the foregoing, it will be evident that at least insofar as the presently shown unit of a model airplane is concerned, the invention eliminates the previous use of pins, rubber bands, tape, etc., as a means for holding the various elements in assembled relationship. This, of course, means that any likelihood of the elements splitting or twisting during assembly is eliminated. Furthermore, there is no requirement or need to prepare a fixture for the assembly and bonding together of the parts of a given unit, inasmuch as the magnets entirely serve this purpose. Thus, it will be appreciated that a complete model of an airplane or other comparable device may be accurately assembled without the provision of multiple jigs or fixtures through the simple expedient of utilizing the magnets shown and described in multiple arrangement for whatever parts it is desired to permanently bond in assembled relationship.

As mentioned, the present embodiment of the invention represents only one application of use and it is therefore contemplated that through the combined use of a plane surface, layout, or plan, and multiple magnets, many other devices or units may be accurately assembled and held until suitable bonding takes place, and that such other uses of the invention are contemplated as being within the scope of the annexed claim.

Having thus set forth my invention, what I claim as new and for which I desire protection by Letters Patent is:

The method of assembling the various generally platelike parts of an article of manufacture consisting in providing a rigid planar steel surface, applying a printed outline or plan of the unit to said surface, successively locate, in superposed relationship, each said platelike part of said unit on the said outline and secure each part by applying permanent magnets to said steel surface on opposite sides of each said part and adjusting them into clamping abutment with said parts whereby each said part is sandwiched between two said magnets applying a bonding agent to all joined parts, and finally, after the bonding agent has set, removing the magnets from the steel surface.

References Cited by the Examiner

UNITED STATES PATENTS

| | | | |
|---|---|---|---|
| 315,458 | 4/1885 | Raymond | 269—8 |
| 1,481,906 | 1/1924 | Jackson | 269—8 X |
| 1,561,063 | 11/1925 | Dunlap | 144—281 |
| 2,002,077 | 5/1935 | Darling et al. | 273—157 |
| 2,348,920 | 5/1944 | Ott | 269—305 X |
| 2,713,379 | 7/1955 | Sisson | 269—8 |
| 3,097,381 | 7/1963 | Kline et al. | 12—142 |
| 3,147,176 | 9/1964 | Haslam | 161—39 |

EARL M. BERGERT, *Examiner.*

H. F. EPSTEIN, *Assistant Examiner.*